United States Patent [19]

Di Pietro

[11] 4,110,550
[45] Aug. 29, 1978

[54] ELECTRICAL CONNECTOR WITH ADAPTOR FOR PAPER-INSULATED, LEAD-JACKETED ELECTRICAL CABLES AND METHOD

[75] Inventor: Francis M. Di Pietro, Mountain Lakes, N.J.

[73] Assignee: Amerace Corporation, New York, N.Y.

[21] Appl. No.: 737,421

[22] Filed: Nov. 1, 1976

[51] Int. Cl.² .................. H02G 15/22; H02G 1/14
[52] U.S. Cl. ........................................ 174/19; 29/628; 174/73 R; 174/75 R
[58] Field of Search ............... 174/19, 20, 21 R, 21 C, 174/22 R, 22 C, 73 R, 73 SC, 74 R, 75 R, 75 D, 75 F, 77 R, 80, 89; 29/628

[56] References Cited

U.S. PATENT DOCUMENTS

| 1,901,667 | 3/1933 | Rah ........................ 174/75 R X |
| 2,089,284 | 8/1937 | Milliken .................. 174/75 R |
| 2,373,843 | 4/1945 | Nicholas .................. 174/73 R |
| 2,967,901 | 1/1961 | Priaroggia ................ 174/73 R |
| 3,242,255 | 3/1966 | Falkenstein et al. ........ 174/73 R |

FOREIGN PATENT DOCUMENTS

22,294 11/1961 German Democratic Rep. ... 174/73 R

*Primary Examiner*—Laramie E. Askin
*Attorney, Agent, or Firm*—S. Michael Bender

[57] ABSTRACT

An electrical connector of the type employing a premolded elastomeric component part has an adaptor which is placed at the terminus of an electrical power distribution cable of the oil-filled type including a conductor, a paper insulator and a lead jacket, to seal the terminus and enable installation, in the field, of the electrical connector for use in an electrical power distribution system. The adaptor includes a sleeve portion of insulating material for placement over the cable insulation, a conductor-sealing portion for receiving the conductor of the cable and a jacket-sealing portion for juxtaposition with the lead jacket to seal the juncture between the lead jacket and the adaptor.

28 Claims, 8 Drawing Figures

ELECTRICAL CONNECTOR WITH ADAPTOR FOR PAPER-INSULATED, LEAD-JACKETED ELECTRICAL CABLES AND METHOD

The present invention relates generally to electrical connections and pertains, more specifically, to an electrical connector of the type employing a premolded elastomeric component part, an adaptor, and a method for sealing the terminus of an oil-filled, paper insulated, lead-jacketed electrical power distribution cable and enabling the installation, in the field, of the electrical connector.

In recent years, the advent of extruded solid dielectric cables, such as polyethylene insulated electrical cables, had led to the displacement of the previously used oil-filled, paper-insulated, lead-jacketed cables (known as "P.I.L.C." cables) in the installation of electrical power distribution systems. However, many existing systems will contain operable paper-insulated, lead-jacketed cables. When a section of existing P.I.L.C. cable is faulted, a need arises to splice a new extruded solid dielectric cable, in the field, to the existing P.I.L.C. cable in the network. In addition, it is sometimes necessary merely to terminate an existing P.I.L.C. cable, in the field, with an appropriate terminating device.

Numerous splices and terminators currently are available for use with paper-insulated, lead-jacketed cables. But these devices generally are bulky and require skilled workers to achieve the oil stops, taping and lead wiping necessary for the use of such devices. A need has arisen for a simplified splice or termination which is easily installed in the field at the terminus of an oil-filled, paper-insulated, lead-jacketed electrical power cable.

Along with the development of the modern extruded solid dielectric cables, a variety of electrical connectors has been evolved, including splice connectors and terminators, which are constructed of premolded elastomeric component parts easily assembled in the field to establish connections and terminations in solid dielectric cables. It would be advantageous, therefore, to have available a method and a device capable of adapting the ubiquitous oil-filled, paper-insulated, lead-jacketed cable for use with component parts of such up-to-date electrical connectors in constructing connections between the older type P.I.L.C. cable and the newer solid dielectric cable and in merely terminating the older type P.I.L.C. cable with a modern terminator.

Accordingly, it is an object of the present invention to provide an adaptor and a method for sealing the terminus of an oil-filled, paper-insulated, lead-jacketed (P.I.L.C.) electrical power cable and adapting the cable for use with electrical connectors of the type employing premolded elastomeric component parts for connection or termination of the cable in an electrical power distribution system.

Another object of the invention is to provide an electrical connector, an adaptor and a method, as described above, which are especially well-suited to use in the field by workers who need not be highly skilled in operations such as taping, lead wiping and the construction of oil stops.

Still another object of the invention is to provide an adaptor and a method, as described above, which, when applied to the terminus of a paper-insulated, lead-jacketed cable, will render the terminus compatible with currently available electrical connectors of the type employed in making connections and terminations, in the field, in the installation of power distribution systems utilizing extruded solid dielectric cables.

A further object of the invention is to provide an electrical connector and an adaptor, as described above, which have a relatively simple construction capable of reliable service in the field and a method, as described above, enabling simplified operations, in the field, for the maintenance and installation of electrical power distribution systems.

A still further object of the invention is to simplify the expansion, repair and general moderization of existing electrical power distribution systems.

The above objects, as well as still further objects and advantages, are attained by the invention, which may be described briefly as an adaptor for placement at the terminus of a high voltage electrical cable of the oil-filled type including a conductor, a paper insulator and a lead jacket, each having a terminal end adjacent the cable terminus, to seal the terminus and enable installation of an electrical connector of the type employing a premolded elastomeric component part for use in an electrical power distribution system, the adaptor comprising a sleeve portion of insulating material extending axially between a first end and a second end, the sleeve portion having an axially extending outer surface and an axially extending opening with an inside diameter corresponding to the diameter of the insulator of the cable, the insulating material being essentially impervious to water and to the oil in the cable, a conductor-sealing portion integral with the first end of the sleeve portion and sealing the opening in the sleeve portion adjacent the first end thereof, the conductor-sealing portion having an axially extending, electrically conductive sheath including an internal passage communicating with the opening in the sleeve portion and corresponding in diameter to the diameter of the conductor of the cable, and a closed end remote from the first end of the sleeve, and a jacket-sealing portion integral with the second end of the sleeve portion, the jacket-sealing portion including an axially extending tubular-walled portion having a sealing surface for being juxtaposed with the lead jacket to seal the juncture between the lead jacket and the adaptor.

The electrical connector includes a component part of elastomeric material fitted over the common surface provided by the outer surfaces of the sleeve portion, the conductor-sealing portion and the jacket-sealing portion of the adaptor, the component part having a bore portion complementary to the common outer surface, the relative dimensions of the bore portion and the common outer surface being such that the bore portion grips the common outer surface in watertight relationship therewith and increases the dielectric strength of the creep path along the interface between the bore portion and the outer surface of the sleeve portion.

The invention further includes a method of adapting the terminus of a high voltage electrical cable of the oil-filled type including a conductor, a paper insulator and a lead jacket to enable installation thereupon of an electrical connector of the type employing a premolded elastomeric component part for use in an electrical power distribution system, the method comprising removing a portion of the lead jacket to expose a length of the insulator adjacent the terminus of the cable, removing a portion of the exposed length of the insulator to bare a length of the conductor at the terminus of the cable, enclosing the terminus of the cable within an adaptor, with the bared length of conductor within a sealed conductive sheath of the adaptor, the exposed length of insulator within an insulating sleeve of the adaptor and a terminal portion of the lead jacket juxtaposed with a tubular-walled portion of the adaptor, and sealing the juncture between the tubular-walled portion of the adaptor and the juxtaposed terminal portion of the lead jacket against water and against the oil within the cable.

The invention will be more fully understood, while still further objects and advantages will become apparent, by reference to the following detailed description of preferred embodiments of the invention illustrated in the accompanying drawing, in which.

Figure 1:
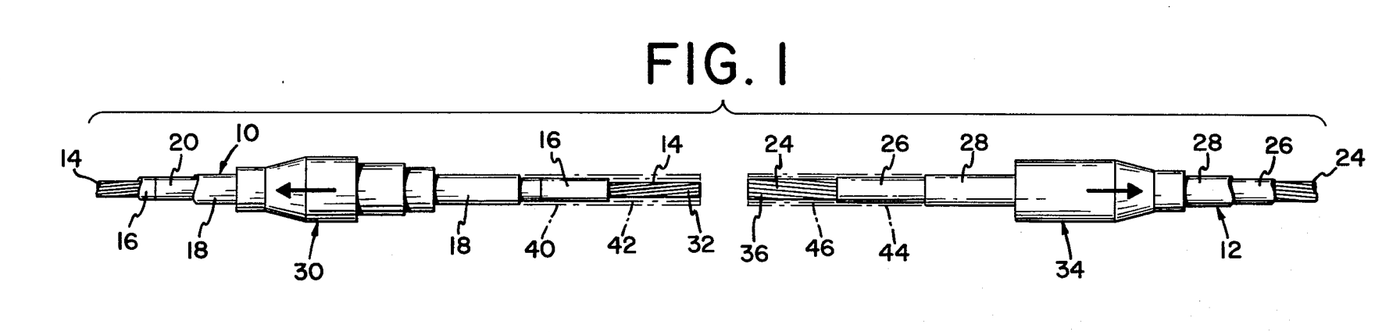
FIGS. 1 through 3 are diagrammatic views illustrating the assembly of a splice connection utilizing the method of the invention and a splice connector with an adaptor, both constructed in accordance with the invention.
Figure 2:
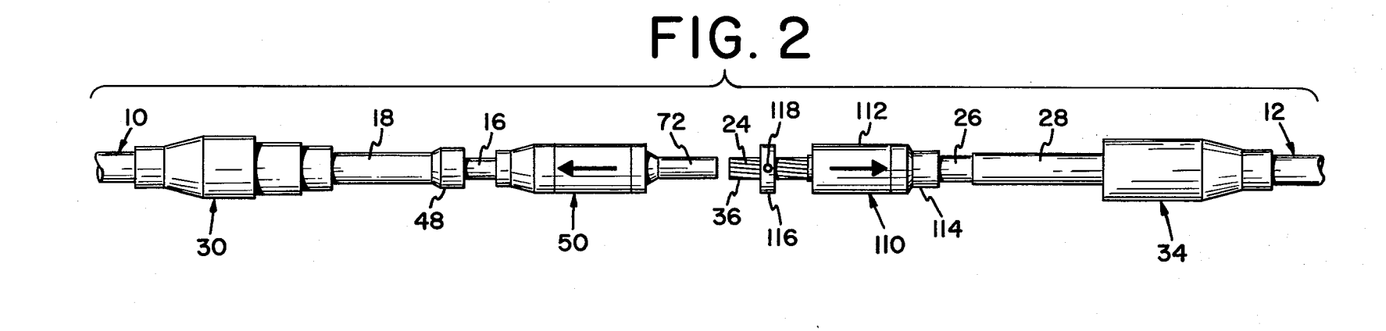
Figure 3:
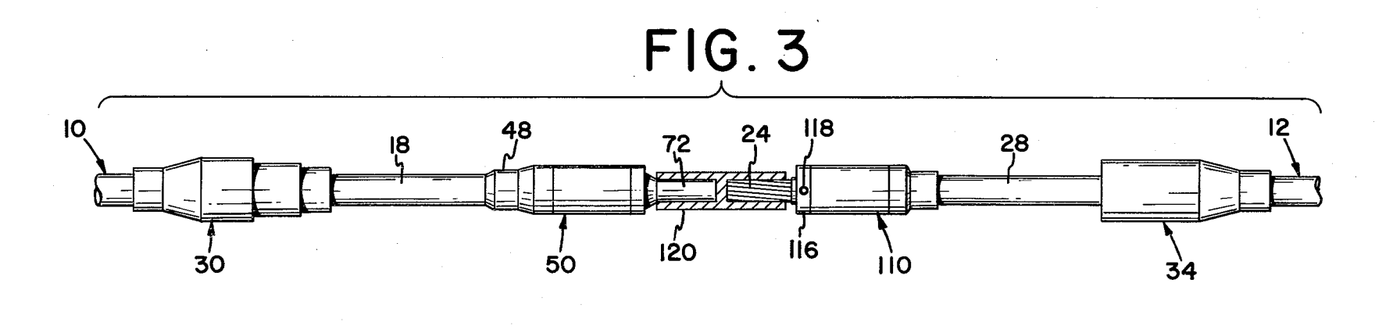

Referring now to the drawing, and especially to FIGS. 1 through 3 thereof, a splice connection is to be made between high voltage electrical cables 10 and 12 in a power distribution system. Cable 10 is an oil-filled, paper-insulated, lead-jacketed (P.I.L.C.) cable in an existing power distribution system. Cable 12 is a more modern extruded solid dielectric cable which is to be spliced into the system. The splice is to be made in the field, utilizing an electrical connector of the type employing premolded elastomeric component parts, all of which will be explained, in detail, below.

Cable 10 includes a conductor 14 sheathed within a paper insulator 16 which, in turn, is jacketed within a lead jacket 18 forming an external shield. A relatively thin layer 20 of conductive material, in the form of carbon impregnated paper tape, is located between the paper insulator 16 and the lead jacket 18 and serves as an internal shield. Cable 10 is filled with a dielectric oil (not shown). In contrast, cable 12 includes a conductor 24 sheathed within an insulator 26 of an extruded solid dielectric such as polyethylene which, in turn, is surrounded by an external shield 28 of a conductive extruded solid material, such as conductive polyethylene.

In order to effect a splice connection between the terminal ends of cables 10 and 12, a first housing member 30 is slipped over the terminus 32 of cable 10 and is moved along the cable away from the terminus thereof, as seen in FIG. 1. Likewise, a second housing member 34 is slipped over the terminus 36 of cable 12 and is advanced along the cable in a direction away from the terminus thereof.

The terminus 32 of cable 10 is prepared by first removing a portion 40 of the lead jacket 18, and a portion of layer 20, to expose a length of paper insulator 16 adjacent the terminus 32 of the cable and then removing a portion 42 of the exposed paper insulator to bare a length of conductor 14 at the terminus 32 of the cable 10.

The terminus 36 of cable 12 is prepared by first removing a portion 44 of shield 28 to expose a length of insulator 26 and then removing a portion 46 of the exposed insulator to bare a length of conductor 24 at the terminus 36 of the cable 12.

As seen in FIG. 2, lead jacket 18 is then flared outwardly, at terminal end portion 48 thereof, away from the underlying layer 20 and insulator 16. An adaptor 50, constructed in accordance with the invention, is slipped over the terminus 32 of cable 10 and is moved along the cable to the position shown in FIG. 3 so as to enclose the cable terminus within the adaptor.

Preferably, the adaptor 50 is filled with a dielectric oil which is the same as, or compatible with, the oil in the cable, prior to placement of the adaptor over the terminus 32 of cable 10 so that the adaptor is moved along the cable toward the position shown in FIG. 3, oil will be exuded from between the cable and the adaptor, taking with it any air which might otherwise be entrapped between the adaptor 50 and the cable 10.

Figure 4:
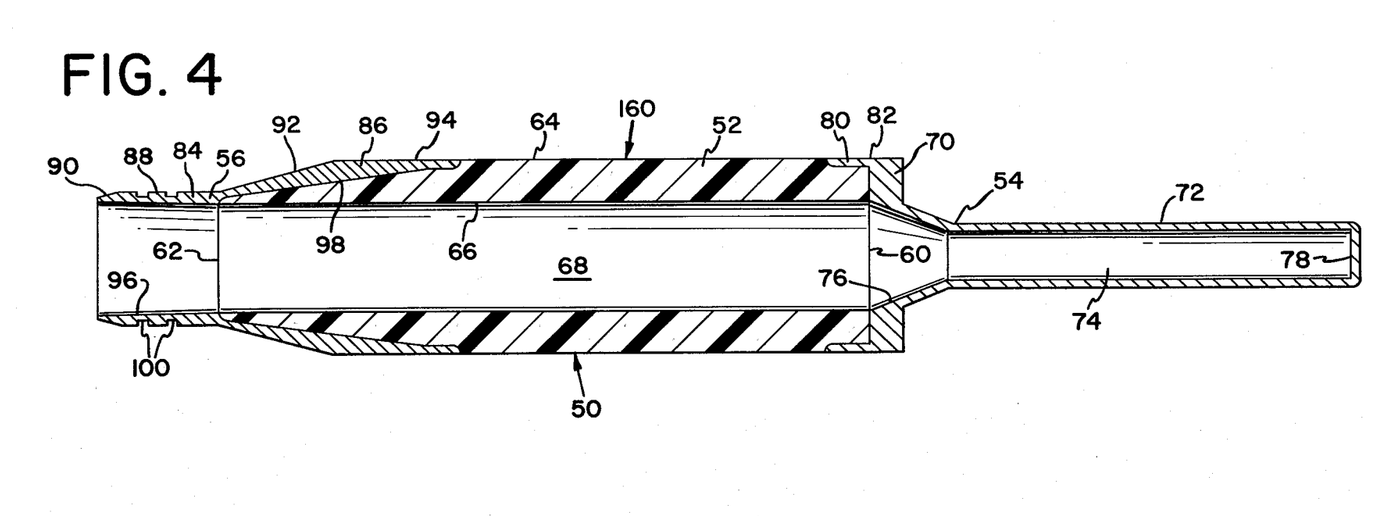
FIG. 4 is an enlarged, longitudinal cross-sectional view of the adaptor.

As best seen in FIG. 4, adaptor 50 is an integral structure including a central sleeve portion in the form of sleeve member 52, a forward conductor-sealing portion in the form of conductor-sealing member 54 and a rearward jacket-sealing portion in the form of jacket-sealing member 56. Sleeve member 52 is generally tubular, extends axially between a forward end 60 and a rearward end 62, and is constructed of insulating material. Outer surface 64 of the sleeve member 52 is generally cylindrical and extends axially along the sleeve member, while inner surface 66 bounds an axially extending opening 68 passing through the sleeve member. In addition to having high dielectric properties, the material of sleeve member 52 is chosen for its ability to resist the absorption or transmission of water or oil of the type employed within cable 10. A suitable material for sleeve member 52 may be chosen from a variety of glass and ceramic materials, as well as from synthetic resin materials.

Conductor-sealing member 54 is integral with the sleeve member 52 and includes a collar 70 affixed to the forward end 60 of the sleeve member 52 and a sheath 72 in the form of a tube unitary with the collar 70 and extending axially therefrom. Sheath 72 has an internal passage 74 communicating with opening 68 in sleeve member 52 through a throat 76 which tapers from the larger diameter of opening 68 to the smaller diameter of passage 74, for purposes which will be described more fully below. The remote end of sheath 72 is closed by an end wall 78 to form a sealed tube. A skirt 80 extends rearwardly from the other end of the conductor-sealing member 54, the skirt 80 and collar 70 having a common outer surface 82 which is in a surface common with outer surface 64 of sleeve member 52. At least the sheath 72 of the conductor-sealing member 54 is constructed of an electrically conductive material, while collar 70 preferably is a heat conductive material. Since the collar 70 and sheath 72 are shown as unitary, the material of both is the same and may be chosen from such metals as copper and aluminum. The wall thickness of the collar 70 is greater than the wall thickness of the sheath 72 for purposes which will be explained below.

Jacket-sealing member 56 is integral with sleeve member 52 and includes a tubular-walled portion 84 projecting axially rearwardly and a forward-extending further portion 86 affixed to the rearward end 62 of sleeve member 52. Tubular-walled portion 84 has an axially extending outer sealing surface 88 and a beveled edge 90. Further portion 86 has an outer surface 92 which tapers from the smaller diameter of sealing surface 88 to a larger diameter at cylindrical outer surface portion 94 which lies in a surface common with outer surface 64 of sleeve member 52. Jacket-sealing member 56 includes a bore 96 having an inside diameter which matches the inside diameter of opening 68 in sleeve member 52. The juncture 98 between the further portion 86 and the sleeve member 52 tapers from a smaller diameter at the tubular-walled portion 84 to a larger diameter at the outer surface 64 of the sleeve member. Jacket-sealing member 56 preferably is constructed of a conductive metal such as brass or bronze for purposes which will become apparent below.

Figure 5:
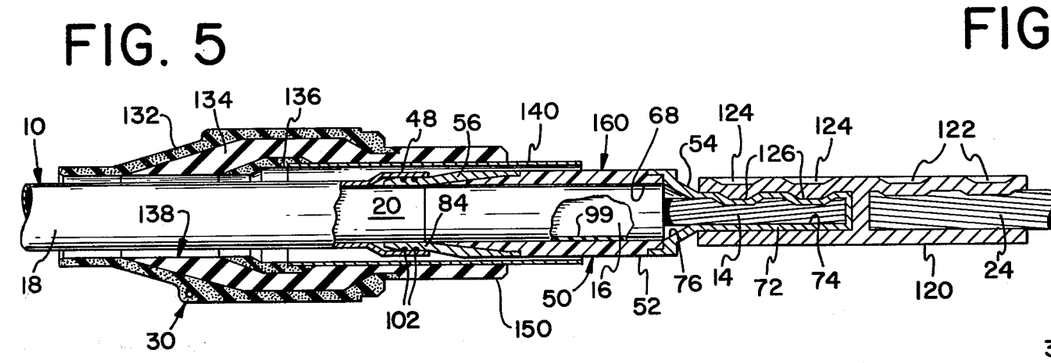
FIG. 5 is a longitudinal cross-sectional view of the adaptor in place at the terminus of a cable, and a housing member being assembled into place upon the adaptor.

Referring now to FIG. 5, as well as to FIGS. 2, 3 and 4, the terminus 32 of cable 10 is enclosed within adaptor 50 by placing the adaptor 50 over the end of the cable and then locating the bared length of conductor 14 within sheath 72, the exposed length of insulator 16 within the sleeve member 52 and the flared terminal end portion 48 of the lead jacket 18 juxtaposed with the tubular-walled portion 84 of the jacket-sealing member 56. The diameter of passage 74 within sheath 72 is generally complementary to the diameter of the bared portion of conductor 14, the choice of passage diameter being determined by established tolerances which have become standard in the design of tubular electrical connectors of the type which generally are crimped to conductors of various sizes. The taper of throat 76 facilitates insertion and seating of the conductor 14 within the sheath 72. The inside diameter of opening 68 ordinarily is complementary to the diameter of the exposed insulator 16 to assure intimate contact between the insulator 16 and sleeve member 52. In some instances, it may be desirable to wrap the exposed length of insulator 16 with a thin wrapping prior to insertion of the exposed length of insulator into sleeve member 52 so as to preclude unraveling of the paper of insulator 16. In the illustrated embodiment, a thin tubular wrapper 99 has been placed over the exposed length of insulator 16. Wrapper 99 may be fabricated of an elastic or heat-shrinkable material. Preferably, wrapper 99 is a tubular member of heat-shrinkable, open-celled silicone rubber foam. Where a wrapper 99 is employed, intimate contact is attained between the insulator 16 and the wrapper 99, and between the wrapper 99 and the inside surface of opening 68. Likewise, intimate contact is attained between bore 96 and the layer 20 of shielding material. The beveled edge 90 facilitates insertion of the tubular-walled portion 84 beneath flared terminal end portion 48 of lead jacket 18.

Figure 6:
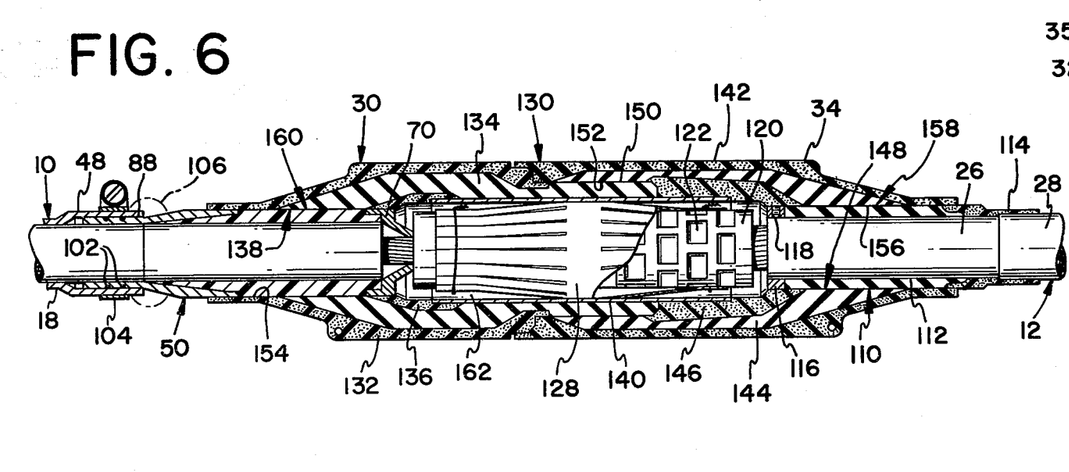
FIG. 6 is a longitudinal cross-sectional view of a fully assembled splice connection.

Once the adaptor 50 is properly seated at the terminus 32 of cable 10, a seal is effected between the tubular-walled portion 84 of the jacket-sealing member 56 and the terminal end portion 48 of the lead jacket 18. In this instance, the sealing means which effects the seal includes a pair of annular grooves 100 within the outer sealing surface 88 of the tubular-walled portion 84 and a sealing ring 102 seated within each groove 100. Later, as seen in FIG. 6, a clamping band 104 is placed around the flared terminal end portion 48 and is drawn tight to compress the end portion 48 and complete an effective seal which will contain the oil within cable 10 and exclude water. Ultimately, a lead wipe may be established between the end of the lead jacket 18 and the jacket-sealing member 56, as shown in phantom at 106. Thus, a clamping band 104 can be used as a temporary measure by a repair crew in the field, leaving the lead wiping operation to be performed later by a more skilled workman for a more permanent seal.

Returning briefly to FIGS. 1 through 3, before completing the splice connection between the terminal ends of cables 10 and 12, a sleeve 110 of elastomeric material is placed upon the terminus 36 of cable 12, with a first, insulating portion 112 of the sleeve 110 engaging the exposed length of insulation 26 and a second, conductive portion 114 of the sleeve 110 engaging the terminal end portion of the shield 28. A retaining ring 116 is fitted to the end of the exposed length of insulation 26 and is secured to cable 12 by pointed set screws 118 which grip the insulation 26 so that the retaining ring 116 will preclude movement of the sleeve 110 in the direction toward the terminal end of the conductor 24 (toward the left, as viewed in FIGS. 1 through 3).

Referring now to FIGS. 5 and 6, as well as to FIG. 3, the sheath 72 of adaptor 50 and the bared length of conductor 24 of cable 12 are inserted into an electrical contact in the form of a crimp barrel 120 which is then crimped at locations along the length thereof to establish crimps 122 and 124. Conductor 24 will be secured by crimps 122 within crimp barrel 120. Crimps 124 will secure sheath 72 within crimp barrel 120 while forming corresponding crimps 126 in the relatively thin wall of sheath 72 to secure conductor 14 within sheath 72. In this manner, a secure mechanical connection, as well as an effective electrical connection, is established between the conductors 14 and 24 of cables 10 and 12. A heat dissipator 128 is then secured in place over the crimp barrel 120.

In order to complete the splice connection between cables 10 and 12, the housing members 30 and 34 are moved toward each other along the respective cables 10 and 12 over and along adaptor 50 and sleeve 110, respectively, and engaged relative to each other to establish a closed housing 130 over the connected conductors, as seen in FIG. 6. Housing member 30 is a composite elastomeric structure having a conductive outer portion 132, an insulating intermediate portion 134 and a conductive inner portion 136. A central bore 138 passes axially through housing member 30 and a metallic tube 140 is seated in a forward portion of the bore 138, making contact with inner portion 136. Likewise, housing member 34 is a composite elastomeric structure having a conductive outer portion 142, an insulating intermediate portion 144 and a conductive inner portion 146. A central bore 148 passes through housing member 34. Housing member 30 includes a plug 150 at the forward end thereof, while housing member 34 has a complementary receptacle 152 at its forward end.

When housing member 30 is moved over and along adaptor 50, the rearward portion 154 of central bore 138 will engage the common surface 160 which includes outer surfaces 64, 82 and 94 of the sleeve member 52, the conductor-sealing member 54 and the jacket-sealing member 56, respectively. The relative dimensions of the rearward portion 154 of central bore 138 and of the common surface 160 along the adaptor 50 are such that the bore portion 154 will be dilated and will grip the adaptor 50 to establish a watertight seal along the interface between the adaptor 50 and the housing member 30, as well as a good electrical connection between the jacket-sealing member 56 and the outer portion 132 of housing member 30, and between the conductor-sealing member 54 and the inner portion 136. At the same time, the tight fit increases the dielectric strength of the creep path along the interface between outer surface 64 of the sleeve member 52 and the intermediate portion 134 of the housing member 30.

A similar relationship is established between housing member 34 and sleeve 110. When housing member 34 is moved into position over sleeve 110, the rearward portion 156 of central bore 148 will engage the outer surface 158 of the sleeve 110. The relative dimensions of the rearward portion 156 of central bore 148 and of outer surface 158 of sleeve 110 are such that the bore portion 156 will be dilated and will grip the sleeve 110 to establish a watertight seal along the interface between the sleeve 10 and the housing member 34, as well as a good electrical connection between the conductive portion 114 of the sleeve 110 and the outer portion 142 of housing member 34, and between the retaining ring 116 and the inner portion 146. At the same time, the tight fit increases the dielectric strength of the creep path along the interface between the outer surface of insulating portion 112 of sleeve 110 and the intermediate portion 144 of the housing member 34. The plug 150 is received within receptacle 152 substantially as shown to seal the connection within a closed cavity 162 within the housing members 30 and 34 and complete the splice.

In the completed splice connection illustrated in FIG. 6, electrical continuity between conductors 14 and 24, as well as a strong mechanical connection, is attained through the crimped connections at the crimp barrel 120. Electrical continuity between the lead jacket 18 (and layer 20) of cable 10 and the shield 28 of cable 12 is attained through the outer portions 132 and 142 of the housing members 30 and 34. The appropriate grading and relief of electrical stresses in the shielding arrangement is attained by the configuration of the outer portions 132 and 142, and the configuration of the jacket-sealing member 56, which includes the tapered juncture 98, and the conductive portion 114 of sleeve 110. The appropriate grading of internal electrical stresses is attained by the inner portions 136 and 146 of the housing members 30 and 34 and metallic tube 140 which also serve as an internal shielding system which eliminates electrical stress within the cavity 162. Heat dissipation from the connected conductors 14 and 24 is aided by the heat dissipator 128 which contacts metallic tube 140. Both the dissipation of heat and the control of electrical stress is facilitated by the conductor-sealing member 54 which provides a heat path and an electrical path of low resistance through the relatively thick wall of collar 70 to the inner portion 136 of housing member 30.

Aside from the adaptor 50, the component parts of the splice connection of FIG. 6 are those employed currently for making splice connections, in the field, between two extruded solid dielectric cables. That is, the housing members 30 and 34, the sleeve 110, the retaining ring 116 and the crimp barrel 120 are all found in commercially available kits for assembling a splice connection in the field. Adaptor 50, by sealing the terminus of P.I.L.C. cable 10 and by providing the common outer surface 160 serves as a substitute for a counterpart sleeve, such as sleeve 110, and enables the use of the already available housing member 30 in the environment resembling that of a splice connection for which housing 30 was originally created. Thus, adaptor 50, which has a relatively simple structure, extends the versatility of currently available connector kits of premolded component parts to electrical power distribution systems requiring connections to P.I.L.C. cables.

From the above description of the use of adaptor 50, it will be seen that the materials chosen for the sleeve member 52, the conductor-sealing member 54, and the jacket-sealing member 56 must have the following properties. The material of the sleeve member 52 must possess good dielectric strength, must be impervious to oil and water and must be mechanically stable enough to provide an outer surface 160 of accurate dimensions to enable an appropriate fit with housing member 30. The material of the sheath 72 of conductor-sealing member 54 should have an electrical conductivity compatible with the conductivity of conductor 14 and should be soft enough to enable the formation of an appropriate crimp 126. The collar 70 of the conductor-sealing member 54 should possess good heat conductivity. Both the sheath 72 and the collar 70 should be impervious to oil and water. The material of the jacket-sealing member 56 must be rigid enough to withstand the pressure of clamping band 104 to establish a good seal along sealing surface 88. If lead wiping is to be used, the material must be compatible with lead wiping materials. The jacket-sealing member 56 must be impervious to oil and water. All of the materials must be compatible with one another insofar as the ability to join the sleeve member 52, the conductor-sealing member 54, and the jacket-sealing member 56 into an integral adaptor 50 and the ability to remain integral under the changes in temperature and internal pressure encountered during use. Hence, such properties as the thermal coefficient of expansion of all of the materials should be matched. Suitable materials for sleeve member 52 are certain ceramics, including both glass and fired ceramics, and synthetic resins. The conductor-sealing member 54 can be made of copper or aluminum, to match copper or aluminum conductors 14. The jacket-sealing member 56 can be fabricated or brass or bronze. The members can be joined by an adhesive or other means, such as molding the sleeve member 52 integrally with the conductor-sealing member 54 and the jacket-sealing member 56.

Figure 7:
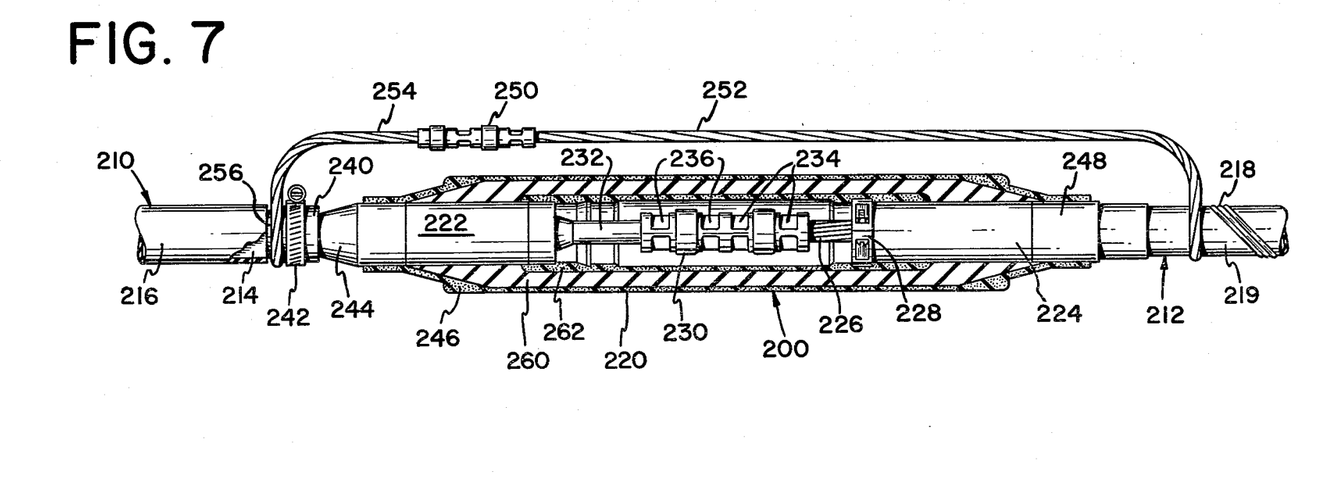
FIG. 7 is a longitudinal cross-sectional view of another fully assembled splice connection with an adaptor, both constructed in accordance with the invention.

Turning now to FIG. 7, another splice connection 200 is illustrated between a paper-insulated, lead-jacketed (P.I.L.C.) cable 210 and an extruded solid dielectric cable 212. In addition to a lead jacket 214, cable 210 includes a non-metallic protective cover 216. Cable 212 has a metal wire shield 218, in addition to the conductive extruded shield 219 which surrounds the cable insulation. Splice connection 200 differs from the splice connection illustrated in FIG. 6 in that a one-piece housing 220 is employed rather than the earlier-described two-piece housing.

In making the splice connection 200, in the field, housing 220 is slipped over one of the cables 210 or 212 and moved along the cable away from the terminus thereof. The terminal ends of the cables are prepared in the same manner as described in connection with FIGS. 1 through 3, including the installation of an adaptor 222, having much the same construction as adaptor 50, upon the terminus of cable 210, and the installation of a sleeve 224, having much the same construction as sleeve 110, upon the terminus of cable 212. In this instance, however, sleeve 224 is retained against movement toward the terminal end of the conductor 226 of cable 212 (to the left, as viewed in FIG. 7) by a split retaining ring 228 which is clamped to the conductor 226 and abuts the confronting end of the sleeve 224. Conductor 226 is inserted into one end of a crimp barrel 230, while the sheath 232 of adaptor 222 is inserted into the other end of the crimp barrel 230. Crimps 234 secure conductor 226 in crimp barrel 230 and crimps 236 secure sheath 232, and the conductor of cable 210, in crimp barrel 230.

The housing 220 is then moved over the crimped connection effected by crimp barrel 230 to take the position illustrated in FIG. 7. The flared terminal end portion 240 of lead jacket 214 is compressed by a clamping band 242 to connect, secure and seal the lead jacket 214 against the jacket-sealing member 244 of the adaptor 222. The shield provided by lead jacket 214 is continued electrically through the electrically conductive outer portion 246 of housing 220 and the electricially conductive rearward portion 248 of sleeve 224 to the shield 219 of cable 212. The ground provided by wire shield 218 of cable 212 is connected to the lead jacket 214 of cable 210 by a crimped connection 250 between an extension 252 of the wire of shield 218 and a length of grounding cable 254 soldered to the lead jacket 214 at 256. Housing 220 includes an intermediate portion 260 of insulating elastomeric material and an internal shielding system in the form of internal portion 262 of conductive elastomeric material.

Figure 8:
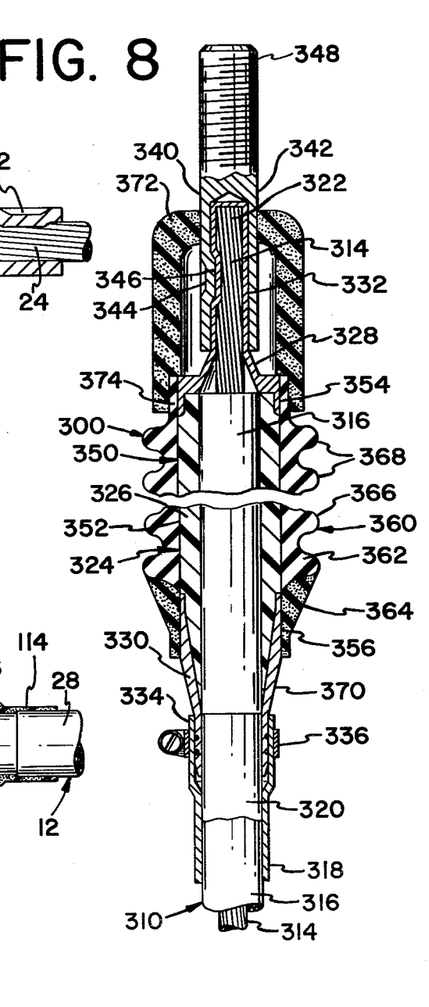
FIG. 8 is a longitudinal cross-sectional view of an assembled terminator with an adaptor, both constructed in accordance with the invention.

Referring now to FIG. 8, another electrical connector is shown in the form of a terminator 300 for terminating a paper-insulated, lead-jacketed (P.I.L.C.) cable 310. Cable 310 has a conductor 314 sheathed within a paper insulator 316 which, in turn, is jacketed within a lead jacket 318. A relatively thin conductive layer 320 is located between the paper insulator 316 and the lead jacket 318.

In a manner similar to that described in connection with FIGS. 1 through 3, the terminus 322 of cable 310 is prepared by exposing a length of insulator 316 and baring a length of conductor 314, and an adaptor 324 is placed over the terminus 322. Adaptor 324 is similar to adaptor 50 and includes a sleeve member 326, a conductor-sealing member 328 and a jacket-sealing member 330, all corresponding to the portions described in connection with adaptor 50. The prepared terminus 322 of cable 310 is sealed by installing adaptor 324 in the same manner as described hereinabove. Thus, the bared length of conductor 314 is received in sheath 332 of the conductor-sealing member 328, the exposed length of insulator 316 is placed within the sleeve member 326 (in this instance, no wrapper is placed over exposed insulator 316) and the jacket-sealing member 330 is juxtaposed with flared terminal portion 334 of the lead jacket 318. Flared terminal portion 334 is compressed by clamping band 336 to connect the lead jacket 318 to the jacket-sealing member 330 and seal the connection.

An electrical contact in the form of post 340 includes a ferrule 342 slipped over the sheath 332 of the conductor-sealing member 328 and the ferrule 342 is crimped at 344 to secure the post 340 to the sheath 332. A corresponding crimp 346 in the sheath 332 secures the sheath to the conductor 314. The post includes a threaded extension 348.

Once the adaptor 324 is installed, the outer surface 350, which is common with the outer surface 352 of the sleeve member 326, the outer surface 354 of the conductor-sealing member 328 and the outer surface 356 of the jacket-sealing member 330, is available for reception of a component part of the connector to be fitted to the cable 310. In this instance, the connector is terminator 300 and the component part is a tubular member 360 of elastomeric material having a first portion 362 of track-resistant insulating elastomeric material and a second portion 364 of conductive elastomeric material. The exterior surface 366 of first portion 362 has annular undulations 368 to increase the resistance to tracking along the exterior surface 366. The second portion 364 has a conical configuration which, together with the tapered configuration of forward portion 370 of the jacket-sealing member 330, serves to relieve excessive electrical stresses at the termination of the shielding system of the cable termination. A cap 372 of elastomeric material is fitted over the post 340 and the forward end 374 of tubular member 360 in watertight relationship with each member to complete the termination 300.

In each of the above-described connector arrangements, including the two splice connections of FIGS. 1 through 7 and the termination of FIG. 8, similar adaptors 50, 222, and 324 are employed to seal the terminus of an oil-filled, paper-insulated, lead-jacketed (P.I.L.C.) cable and provide an appropriate surface for receiving a premolded, elastomeric component part of the connector. In the splice connection of FIGS. 1 through 6, the component part is housing member 30; in the splice connection of FIG. 7, the component part is housing 220; and in the termination of FIG. 8, the component part is tubular member 360. Each of these component parts includes an internal bore which is dilated to grip the outer surface of the corresponding adaptor in appropriate fashion to construct a connector device in the field. Thus, elastomeric component parts originally designed and manufactured for use in connecting and terminating modern extruded solid dielectric cables are now made compatible for use with existing oil-filled, paper-insulated, lead-jacketed (P.I.L.C.) cables.

It is to be understood that the above detailed description of embodiments of the invention are provided by way of example only. Various details of design and construction may be modified without departing from the true spirit and scope of the invention, as set forth in the appended claims.

The embodiments of the invention in which an exclusive property or privilege is claimes are defined as follows:

1. An adaptor for placement at the terminus of a high voltage electrical cable of the oil-filled type including a conductor, a paper insulator and a lead jacket, each having a terminal end adjacent the cable terminus, to seal the terminus and enable installation of an electrical connector of the type employing a pre-molded elastomeric component part for use in an electrical power distribution system, the adaptor comprising:

a sleeve portion of insulating material extending axially between a first end and a second end, the sleeve portion having an axially extending outer surface and an axially extending opening, said insulating material being essentially impervious to water and to the oil in the cable;

a conductor-sealing portion integral with the first end of the sleeve portion and sealing the opening in the sleeve portion adjacent the first end thereof, the conductor-sealing portion having an axially extending, electrically conductive sheath including an internal passage communicating with the opening in the sleeve portion, and a closed end remote from the first end of the sleeve portion;

a jacket-sealing portion integral with the second end of the sleeve portion, the jacekt-sealing portion including an axially extending tubular-walled portion having a sealing surface for being juxtaposed with the lead jacket to seal the juncture between the lead jacket and the adaptor; and sealing means for providing an oil seal and a water seal along the sealing surface of the tubular-walled portion of the jacket-sealing portion, wherein the tubular-walled portion includes an outer surface and is to be received between the lead jacket and the insulator of the cable, and the sealing surface is located upon the outer surface of the tubular-walled portion, and wherein the sealing means includes a sealing member retained upon the sealing surface of the tubular-walled portion of the jacket-sealing portion.

2. The invention of claim 1 wherein the tubular-walled portion is sufficiently rigid to enable the lead jacket to be placed in sealing engagement therewith.

3. The invention of claim 1 wherein the tubular-walled portion includes at least one annular groove in the sealing surface thereof and the sealing member comprises an annular seal seated in said groove.

4. The invention of claim 1 wherein the jacket-sealing portion is a unitary, electrically conductive member having an outer surface and includes the tubular-walled portion and a further portion extending axially along the sleeve portion from the second end toward the first end of the sleeve portion.

5. The invention of claim 4 wherein the further portion of the jacket-sealing portion overlaps the sleeve portion and includes an outer surface having an axially extending portion lying in a common surface with the outer surface of the sleeve portion and an axially extending juncture between the further portion and the sleeve portion.

6. The invention of claim 5 wherein the tubular-walled portion has an outer surface with a diameter smaller than that of the outer surface of the sleeve portion, and the outer surface of the jacket-sealing portion tapers from the smaller diameter of the outer surface of the tubular-walled portion to the larger diameter of the axially extending outer surface portion lying in the common outer surface.

7. The invention of claim 6 wherein the juncture between the further portion of the jacket-sealing portion and the sleeve portion tapers from a smaller diameter at the tubular-walled portion to a larger diameter at the outer surface of the sleeve portion.

8. The invention of claim 1 wherein the conductor-sealing portion is a metal member affixed to the sleeve portion and the electrically conductive sheath is a crimpable metal tube.

9. The invention of claim 8 wherein the metal member includes a collar contiguous with the first end of the sleeve portion, the collar having an axially extending outer surface lying in a common surface with the outer surface of the sleeve portion.

10. The invention of claim 9 wherein the collar is constructed of a material of relatively high heat conductivity and has a wall thickness greater than the wall thickness of the sheath.

11. The invention of claim 10 wherein the metal member includes a throat extending between the opening of the sleeve portion and the passage in the sheath, the throat being tapered from a larger diameter at the opening to a smaller diameter at the passage.

12. The invention of claim 11 wherein the collar and the tube are unitary.

13. In an electrical connector placed at the terminus of a high voltage cable of the oil-filled type including a conductor, a paper insulator and a lead jacket, a portion of the lead jacket having been removed to expose a length of the insulator adjacent the terminus of the cable and a portion of the exposed length of the insulator having been removed to bare a length of the conductor at the terminus of the cable:

an adaptor placed at the terminus of the cable, said adaptor including a sleeve portion of insulating material extending axially between a first end and a second end, the sleeve portion having an axially extending outer surface and an axially extending opening juxtaposed with the exposed length of the insulator, said insulating material being essentially impervious to water and to the oil in the cable, a conductor-sealing portion integral with the first end of the sleeve portion and sealing the opening in the sleeve portion at the first end thereof, the conductor-sealing portion having an outer surface and an axially extending, electrically conductive sheath including an internal passage communicating with the opening in the sleeve portion and a closed end remote from the first end of the sleeve portion, the conductive sheath being placed over the bared length of conductor, and a jacket-sealing portion integral with the second end of the sleeve portion, the jacket-sealing portion including an outer surface and an axially extending tubular-walled portion overlapping the terminal end of the lead jacket and the insulator, said tubular-walled portion having a sealing surface juxtaposed with the lead jacket to seal the juncture between the lead jacket and the adaptor, the outer surfaces of the sleeve portion, the conductor-sealing portion and the jacket-sealing portion lying in a common outer surface of the adaptor; and a component part of elastomeric material fitted over the common outer surface of the adaptor, said component part having a bore portion complementary to the common outer surface, the relative dimensions of the bore portion and the common outer surface being such that the bore portion grips the common outer surface in watertight relationship therewith and increases the dielectric strength of the creep path along the interface between the bore portion and the outer surface of the sleeve portion.

14. The invention of claim 13 wherein the tubular-walled portion of the jacket-sealing portion has an outer surface with a diameter smaller than the diameter of the outer surface of the sleeve portion and includes a further portion extending axially along the sleeve portion from said second end toward said first end, and said further portion has an outer surface tapering from the smaller diameter of the outer surface of the tubular-walled portion to the larger diameter of the axially extending outer surface which lies in the common outer surface.

15. The invention of claim 14 wherein the juncture between the further portions of the jacket-sealing portion and the sleeve portion tapers from a smaller diameter at the tubular-walled portion to a larger diameter at the interface between the bore portion of the component part and the outer surface of the sleeve portion.

16. The invention of claim 15 wherein:

the jacket-sealing portion is a unitary, electrically conductive member which includes the tubular-walled portion and the further portion extending axially along the sleeve portion from the second end toward the first end of the sleeve portion, the further portion overlapping the sleeve portion and including an outer surface having an axially extending portion lying in the common outer surface of the adaptor, and an axially extending juncture between the further portion and the sleeve portion; and the component part includes a portion of conductive material fitted over the axially extending portion of the further portion of the jacket-sealing portion and making an electrical connection therewith.

17. The invention of claim 16 wherein the tubular-walled portion is received between the terminal end of the lead jacket and the insulator of the cable.

18. The invention of claim 17 wherein the adaptor includes sealing means at the sealing surface of the tubular-walled portion of the jacket sealing portion for providing an oil seal and a water seal at the juncture between the lead jacket and the adaptor.

19. The invention of claim 18 including means compressing the terminal end of the lead jacket toward the tubular-walled portion of the jacket-sealing portion.

20. The invention of claim 19 wherein the means compressing the terminal end of the lead jacket comprises a clamping band.

21. An electrical connector kit for establishing a connection in the field at the terminus of a high voltage cable of the oil-filled, paper-insulated, lead-sheathed type, said kit comprising a sleeve-like adaptor member and a sleeve-like elastomeric stress-grading element, said adaptor member having a first conductive closed end portion, a second conductive open end portion, and an insulative intermediate portion therebetween, said adaptor member being adapted to be fitted over the terminus of said high voltage cable with the core of the cable being received in the first conductive closed end portion, the insulation of the cable being received in the insulative intermediate portion and said second conductive open end portion being in sealing engagement with the lead sheath of said cable, said elastomeric stress-grading element having an opening at one end thereof extending interiorly of said element toward another end thereof to define a resilient bore of predetermined size sufficient to cause said element to tightly grip the exterior surface of said adaptor member when said stress-grading element is fitted over said adaptor with said first conductive closed end and at least a portion of said intermediate portion being received within said resilient bore of said element.

22. The kit of claim 21 wherein said elastomeric sleeve-like stress-grading element includes a conductive portion adjacent said opening at said one end thereof adapted to overlap said second conductive end portion of said adaptor member in electrical engagement therewith when said stress-grading element is fitted over said adaptor member as hereinaforesaid.

23. A method of adapting the terminus of a high voltage electrical cable of the oil-filled type including a conductor, a paper insulator and a lead jacket to enable installation thereupon of an electrical connector of the type employing a pre-molded elastomeric component part for use in an electrical power distribution system, the method comprising:

removing a portion of the lead jacket to expose a length of the insulator adjacent the terminus of the cable;

removing a portion of the exposed length of the insulator to bare a length of the conductor at the terminus of the cable;

flaring the terminal portion of the lead jacket outwardly away from the underlying insulator of the cable;

enclosing the terminus of the cable within an adaptor, by placing the bared length of conductor within a sealed conductive sheath of the adaptor, placing the exposed length of insulator within an insulating sleeve of the adaptor and placing a tubular-walled portion of the adaptor between the flared terminal portion of the lead jacket and the underlying insulator; and sealing the juncture between the tubular-walled portion of the adaptor and the terminal portion of the lead jacket against water and against the oil within the cable.

24. The invention of claim 23 including wrapping the exposed length of the insulator in a wrapper prior to enclosing the terminus of the cable within the adaptor.

25. The invention of claim 23 wherein the step of sealing the juncture between the tubular-walled portion of the adaptor and the terminal portion of the lead jacket includes compressing the terminal portion of the lead jacket toward the tubular-walled portion of the adaptor.

26. The invention of claim 23 wherein the step of sealing the juncture between the tubular-walled portion of the adaptor and the terminal portion of the lead jacket includes lead wiping.

27. A method of establishing a connection in the field at the terminus of a high voltage cable of the oil-filled, paper-insulated, lead-sheathed type, with the aid of a sleeve-like adaptor member and a sleeve-like elastomeric stress-grading element, said adaptor member having a first conductive closed end portion, a second conductive open end portion, and an insulative intermediate portion therebetween, said elastomeric stress grading element having an opening at one end thereof extending interiorly of said element toward another end thereof to define a resilient bore of predetermined size, said method comprising the following steps: fitting said adaptor member over the terminus of said high-voltage cable with the core of the cable being received in the first conductive closed end portion, the insulation of the cable being received in the insulative intermediate portion, and the second conductive open end portion being in sealing engagement with the lead sheath of said cable, establishing a seal between said second conductive end portion of said adaptor member and the lead sheath of said cable, and fitting said elastomeric stress-grading element over said adaptor member with the resilient bore portion thereof tightly gripping the exterior surface of said adaptor, and with said first conductive closed end portion and at least a portion of said intermediate portion of said adaptor being received within said resilient bore of said stress-grading element.

28. The method of claim 27 wherein said elastomeric stress-grading element includes a conductive portion adjacent said opening at said one end thereof and said step of fitting said elastomeric sleeve-like stress-grading element over said adaptor means includes the further step of sliding said elastomeric sleeve-like stress-grading element relative to said adaptor member until said conductive portion of said stress-grading element overlaps said second conductive end portion of said adaptor member in electrical engagement therewith.

* * * * *